Sept. 2, 1969   W. A. EGGERS   3,464,139
ILLUMINABLE FISH ATTRACTING FLOAT
Filed Sept. 21, 1967
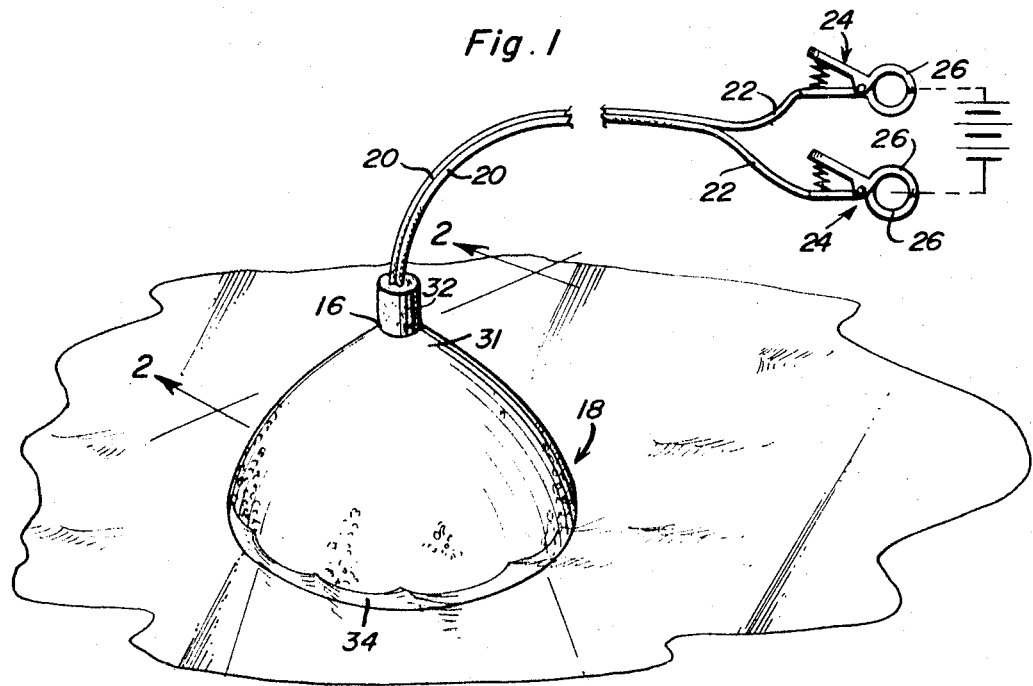
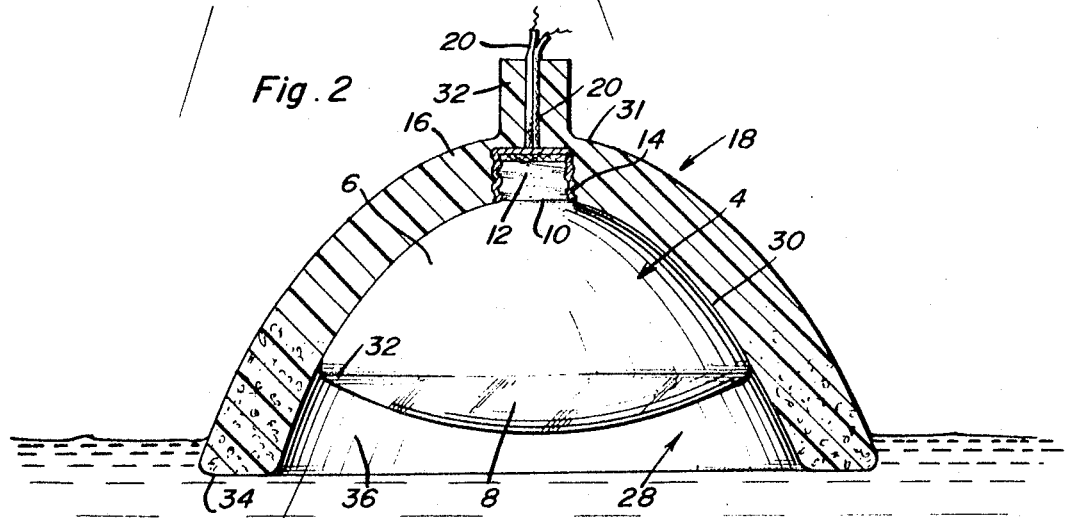
Walter A. Eggers
INVENTOR.

3,464,139
ILLUMINABLE FISH ATTRACTING FLOAT
Walter A. Eggers, Springfield, Mo., assignor of one-half
to Larry A. Eggers, Springfield, Mo.
Filed Sept. 21, 1967, Ser. No. 669,644
Int. Cl. A01k *97/00;* F21v *31/00;* F21l *15/08*
U.S. Cl. 43—17.5                                                          3 Claims

ABSTRACT OF THE DISCLOSURE

A device expressly adapted for night fishing that floats atop the water comprising a sealed-beam lamp removably lodged in the upper chamber portion of a molded recess in a canopy-like float. The bottom face or lens of the lamp is elevated above the bottom of the float and is spaced above the water. Current can be supplied to the lamp by conducting wires having spring clips which are capable of being attached to terminals on a storage battery or the like aboard a fishing boat.

---

This invention relates to certain new and useful improvements in a night fishing device, more particularly, a foam or an equivalent moldable rubber float having a unique built-in sealed beam lamp which is effectually enclosed and shielded within the confines of the cavity or recess and which has its bottom or lens substantially parallel to but spaced above the water to focus the light beam directly down into the water to attract the fish and mark the fishing spot.

It is not new to provide a sealed beam lamp with buoyant means and a current conducting cord. Such an adaptation is shown in a patent to Campbell 2,757,276. By comparison the Campbell patent is deemed to be relatively complicated and expensive and involves the use of a handle or reach rod and is primarily intended as an underwater light for spearing fish. The flotation means is employed to keep from losing the device should it be accidentally dropped in the water being fished. One object of the present invention is to structurally, functionally and in other ways improve upon prior patented illuminable fish attracting devices many of which cannot be properly used because of the fact that it is against the law in many states to use an artificial light beneath the surface of the water.

Briefly, the present invention has to do with a fish attracting device which is characterized by a float of the type which is adapted to reside and rove in a limited manner within range of a given fishing spot atop the water which is being fished. This float is provided with a source of illumination which is uniquely embodied in the float in a manner to concentrate and project a suitable beam of light which is capable of penetrating straight down into the water in a manner to attract fish and also to assist the angler in spotting the same.

More specifically, the preferred embodiment of the float is one which is made from moldable commercial plastics such as a suitable grade of foam rubber, the resultant float being domical in general appearance and hollow and providing a lamp sheathing canopy. The hollow portion defines an open bottom recess and the upper part of the recess provides a seating and retaining pocket. It is in this pocket that the insertable and removable sealed beam lamp is replaceably fitted and retained. The crown portion of the float is provided interiorly with a socket and contact means for the screw-threaded neck of the attachable and detachable lamp and externally with an integral upstanding stud constituting a fingergripping handle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of an illuminable fish attracting float constructed in accordance with the invention showing the manner in which it is constructed and readied for use, that is, when connected to the posts of a storage battery or an equivalent source of current.

FIG. 2 is an enlarged view with parts in section and elevation taken approximately on the plane of the section line 2—2 of FIG. 1.

A primary component of the unique device is the source of illumination. While this source could be a lamp of some type other than that shown, it is preferably a sealed beam lamp such as denoted at 4 in FIG. 2. This lamp embodies a hemispherical body portion 6 and a concavo-convex lens 8. The crown portion 10 is provided with an upstanding axial screw-threaded neck 12 which is screwed into a companion screwthreaded socket 14 provided therefor in the axial crown portion 16 of the encasing and shielding float 18. The neck 12 is provided with suitable contacts cooperable with current conducting wires 20, which in practice may be of any appropriate length and which are provided at their free end portions 22 with spring-loaded battery terminal clips 24. These clips have cooperating semi-circular gripping jaws 26 capable of satisafctory engagement with terminal posts on a storage battery or equivalent batteries or a source of current aboard the fishing boat. By utilizing long cords or wires it will be seen that the float, in a manner of speaking, is anchored but is allowed to rove as suggested in FIG. 1. With further reference to the float it will be seen that it is intended to function as a canopy and shield for the lamp and also as a floating buoy. The hollow or recessed portion 28 is preferably conformable with that shown in FIG. 2. It will be noted in this connection that the upper portion of the recess provides a substantially semi-spherical pocket or chamber 30 in which the body portion of the lamp is snugly but retentively fitted. The convex surface of the crown portion 31 is provided with an integral upstanding stud 32 which provides a practical finger-grippable handle. The flat-faced bottom of the float is denoted at 34 and the skirt portion of the recess below the lamp is denoted at 36.

It will be evident that an encased sealed-beam lamp such as that shown can be used as a trouble light and for other miscellaneous purposes. Primarily, however, this illuminable light source was devised and is resourcefully adapted for use in the manner shown in FIGS. 1 and 2 wherein it will be observed that the lens 8 maintains a level or position above the level of the water and therefore does not dip down into the water itself. A lamp equipped float such as that herein shown and described well served the purposes for which it is intended. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An illuminable fish-attracting and luring device comprising, in combination, a domical hollow float defining a lamp sheathing canopy, the hollow portion of said float being concave-convex and providing an open bottom recess and upper portion providing a lamp-enclosing, seating and retaining pocket, the upper central portion of the said hollow portion having a downwardly-opening screw-threaded socket with contact means at its inner end, operatively cooperable electric current delivery wires extending from said contact means through the said upper central portion to an electrical source, an insertable and removable sealed-beam lamp snugly and retentively fitted and wholly confined within the limits of said pocket, the upper surface portion of said lamp having a screw-threaded neck which is removably screwed into said socket, said lamp having a bottom beam focusing lens, said lens being elevated and disposed in a plane above the plane of the bottom of said float.

2. The fish attracting and luring device defined in and according to claim 1, wherein the float, when in use atop the water, conceals the lamp and assists in confining and directing the light rays straight down into the water which is being fished.

3. The fish attracting and luring device defined in and according to claim 2, and wherein the exterior convex axial surface portion of the domical float is provided with an integral upstanding stud of predetermined requisite length and cross-sectional dimension, said stud providing a manually grippable handle, said handle being in axial alignment with said socket.

References Cited

UNITED STATES PATENTS

| | | | |
|---|---|---|---|
| 1,448,120 | 3/1923 | Johnson | 43—17.5 |
| 2,431,420 | 11/1947 | Pope | 43—17.5 |
| 2,757,276 | 7/1956 | Campbell | 240—26 |
| 2,908,101 | 10/1959 | Butler et al. | 43—17.5 |
| 3,005,908 | 10/1961 | Farina | 240—26 |

SAMUEL KOREN, Primary Examiner

DANIEL J. LEACH, Assistant Examiner